(12) United States Patent
Persson

(10) Patent No.: US 12,023,604 B2
(45) Date of Patent: Jul. 2, 2024

(54) METHOD AND SYSTEM FOR PURIFICATION OF OIL

(71) Applicant: ROCCO Slop AB, Östersund (SE)

(72) Inventor: Thomas Persson, Östersund (SE)

(73) Assignee: SKF MFR Technology AB, Stockholm (SE)

( * ) Notice: Subject to any disclaimer, the term of this patent is extended or adjusted under 35 U.S.C. 154(b) by 346 days.

(21) Appl. No.: 16/301,309

(22) PCT Filed: May 8, 2017

(86) PCT No.: PCT/SE2017/050453
§ 371 (c)(1),
(2) Date: Nov. 13, 2018

(87) PCT Pub. No.: WO2017/196233
PCT Pub. Date: Nov. 16, 2017

(65) Prior Publication Data
US 2019/0192996 A1 Jun. 27, 2019

(30) Foreign Application Priority Data
May 10, 2016 (SE) .................................. 1650628-9

(51) Int. Cl.
*B01D 17/12* (2006.01)
*B01D 17/04* (2006.01)
(Continued)

(52) U.S. Cl.
CPC ........... *B01D 17/12* (2013.01); *B01D 17/047* (2013.01); *C10G 29/00* (2013.01); *C10G 33/04* (2013.01); *C10G 33/08* (2013.01)

(58) Field of Classification Search
CPC .......... C02F 2101/32; C02F 1/40; C02F 9/00; C02F 2103/365; C02F 11/12; C02F 1/441;
(Continued)

(56) References Cited

U.S. PATENT DOCUMENTS 3,565,252 A * 2/1971 Sheehy .................. B01D 17/02
210/104
3,878,094 A * 4/1975 Conley .............. B01D 17/0214
210/DIG. 5

(Continued)

FOREIGN PATENT DOCUMENTS

CA 2597344 A1 2/2008
CN 102989200 A 3/2013
(Continued)

OTHER PUBLICATIONS

Donald L. Robinson, Chemistry 102—Recrystallization and Extractions of Organic Compounds, https://home.miracosta.edu/dlr/102exp3.htm (2009) (Year: 2009).*

*Primary Examiner* — Chester T Barry
(74) *Attorney, Agent, or Firm* — Dilworth & Barrese, LLP

(57) ABSTRACT

A method and a system for purification of oil, wherein the method comprises the steps of:—adding to a contaminated oil provided in a preparation tank a chemical booster for boosting capturing of impurities and/or a separation of phases in the contaminated oil; —waiting for allowing different phases to be separated; —pumping content out from the preparation tank through a fluid connection; sensing at least one property of the content in the fluid connection; —controlling a valve provided in the fluid connection to transfer the content to a next step in the purification process or to another destination in dependence of the sensed at least one property.

25 Claims, 4 Drawing Sheets

(51) Int. Cl.
*C10G 29/00* (2006.01)
*C10G 33/04* (2006.01)
*C10G 33/08* (2006.01)

(58) Field of Classification Search
CPC ........ C02F 2201/008; C02F 1/20; C02F 1/38;
C02F 1/42; C02F 1/442; C02F 1/463;
C02F 1/52; C02F 1/66; C02F 2001/007;
C02F 2101/20; C02F 2209/00; C02F
2209/005; C02F 2209/006; C02F
2209/008; C02F 3/082; C02F 1/008;
C02F 1/24; C02F 1/28; C02F 1/32; C02F
1/44; C02F 1/444; C02F 1/465; C02F
2001/46119; C02F 2001/46128; C02F
2001/46133; C02F 2001/46152; C02F
2201/461; C02F 2201/4612; C02F
2201/46135; C02F 2201/4614; C02F
2209/05; C02F 2209/06; C02F 2301/063;
C02F 2303/12; C02F 2303/16; C02F
2303/20; B01D 17/06; B01D 17/0217;
B01D 21/262; B01D 17/02; B01D
19/0063; B01D 21/267; B01D 17/045;
B01D 11/0207; B01D 11/0284; B01D
17/042; B01D 17/047; B01D 21/01;
B01D 61/025; B01D 17/12; B01D
19/0036; B01D 2311/04; B01D 2311/12;
B01D 2311/18; B01D 2311/2642; B01D
61/02; B01D 61/022; B01D 61/027;
B01D 61/04; B01D 65/02; B01D
2313/243; B01D 2315/04; B01D 2315/10;
B01D 2321/2058; B01D 2321/2066;
B01D 61/10; B01D 65/08; C10G 29/00;
C10G 33/04; C10G 33/08
See application file for complete search history.

(56) References Cited

U.S. PATENT DOCUMENTS

| | | | |
|---|---|---|---|
| 4,018,683 A * | 4/1977 | Walters | B01D 17/04 210/739 |
| 4,973,299 A * | 11/1990 | Rubin | B04B 1/04 494/79 |
| 5,570,744 A | 11/1996 | Weingarten et al. | |
| 5,996,690 A * | 12/1999 | Shaw | B04C 11/00 166/250.01 |
| 6,214,236 B1 * | 4/2001 | Scalliet | B01D 17/0217 210/708 |
| 2003/0136747 A1 * | 7/2003 | Wood | B09C 1/06 210/774 |
| 2004/0244983 A1 * | 12/2004 | Appleford | E21B 43/36 166/357 |
| 2008/0288181 A1 * | 11/2008 | Lucero | G01N 9/36 702/23 |
| 2011/0283809 A1 * | 11/2011 | Pihlaja | G01F 15/08 137/552 |
| 2012/0152121 A1 * | 6/2012 | Sampath | B01D 19/0042 96/182 |
| 2012/0160660 A1 * | 6/2012 | Karlstrom | B01D 1/0058 202/234 |
| 2013/0026082 A1 | 1/2013 | Al-Shafei et al. | |
| 2013/0082010 A1 * | 4/2013 | Al-Mulhim | B01D 17/0208 210/130 |
| 2014/0077825 A1 * | 3/2014 | Coleman | G01N 27/06 324/679 |
| 2014/0083950 A1 * | 3/2014 | Usher | E02B 15/045 210/85 |
| 2014/0183058 A1 * | 7/2014 | Wiemers | B01D 61/02 205/746 |
| 2015/0307810 A1 * | 10/2015 | Stigsson | C10L 10/12 554/175 |
| 2016/0207791 A1 * | 7/2016 | Rabe | B03D 1/24 |
| 2017/0160069 A1 * | 6/2017 | Folgero | G01N 27/06 |
| 2018/0305604 A1 * | 10/2018 | Breedlove | C09K 8/58 |
| 2019/0192996 A1 * | 6/2019 | Persson | C10G 29/00 |
| 2020/0230520 A1 * | 7/2020 | Sundström | C10G 33/08 |

FOREIGN PATENT DOCUMENTS

| | | | | |
|---|---|---|---|---|
| CN | 103127746 B | 10/2014 | | |
| JP | S55-28747 A | 2/1980 | | |
| JP | S59-112808 A | 6/1984 | | |
| JP | H1-275692 A | 11/1989 | | |
| JP | 2005-046657 A | 2/2005 | | |
| JP | 2012-245459 A | 12/2012 | | |
| WO | 00/71640 A1 | 11/2000 | | |
| WO | WO-2010111291 A2 * | 9/2010 | ........ | B01D 61/142 |
| WO | 2013/049271 A1 | 4/2013 | | |
| WO | 2015/026722 A1 | 2/2015 | | |
| WO | WO-2016002110 A1 * | 1/2016 | ........ | C02F 1/38 |

* cited by examiner

METHOD AND SYSTEM FOR PURIFICATION OF OIL

TECHNICAL FIELD OF THE INVENTION

The present invention relates to a method and a system for purification of oil.

BACKGROUND OF THE INVENTION

Purification of oils, such as for example slop oil, waste oil and industrial oil is important for the possibility to reuse oils and therefore an important factor for the environmental future and the limited nature resources of oils. Purification of slop oil is problematic in many ways. Slop oil can comprise oil, water, particles and emulsion phase. The particles can stabilize the emulsion phase and complicate a purification process. Purification of industrial emulsions comprising water and oil, such as for example cutting fluids is also an important environmental issue.

SUMMARY

An object of the present invention is to improve efficiency in purification of oils.

This is achieved by a method for purification of oil comprising the steps of:
  adding to a contaminated oil provided in a preparation tank a chemical booster for boosting capturing of impurities and/or a separation of phases in the contaminated oil;
  waiting for allowing different phases to be separated;
  pumping content out from the preparation tank through a fluid connection;
  sensing at least one property of the content in the fluid connection;
  controlling a valve provided in the fluid connection to transfer the content to a next step in the purification process or to another destination in dependence of the sensed at least one property.

This is also achieved by a system for purification of oil, said system comprising:
  at least one preparation tank in which a contaminated oil and a chemical booster for boosting capturing of impurities and/or separation of phases in the contaminated oil is provided;
  at least one centrifugal separator;
  a fluid connection allowing transfer of content out from the preparation tank; and
  at least one redirection arrangement provided in the fluid connection, said redirection arrangement comprising a valve which is arranged to direct the content from the preparation tank to either the centrifugal separator, possibly via another tank, or to another destination, said redirection arrangement further comprising at least one sensor and a control system connected to the at least one sensor and to the valve, wherein said control system is arranged for controlling said valve to transfer said content to the centrifugal separator or to the other destination in dependence of an output from the at least one sensor.

Hereby content on its way from a preparation tank to a next step in the purification process can be automatically redirected to another destination if a sensor indicates that the content is not suitable for the next purification step. This could for example be if a phase of water is transferred out from the preparation tank. In that case it would be better to redirect the water phase to another destination and not provide it into for example a centrifugal separator.

In one embodiment of the invention the method further comprises controlling said valve to only transfer the content to the next step of the purification process if the sensed property corresponds to an oil content above a predefined threshold.

Hereby content comprising a low percentage of oil can be redirected to another destination possibly for further purification by other means.

In one embodiment of the invention the method further comprises controlling said valve to not transfer the content to the next step of the purification process if the sensed property indicates that the content is water. Hereby water can be redirected to another destination.

In one embodiment of the invention the step of sensing comprises sensing dielectric properties of the content. A sensor detecting dielectric properties is robust also in harsh environments.

Further embodiments are described in the detailed description and in the dependent claims.

DETAILED DESCRIPTION OF THE EMBODIMENTS

Figure 1:
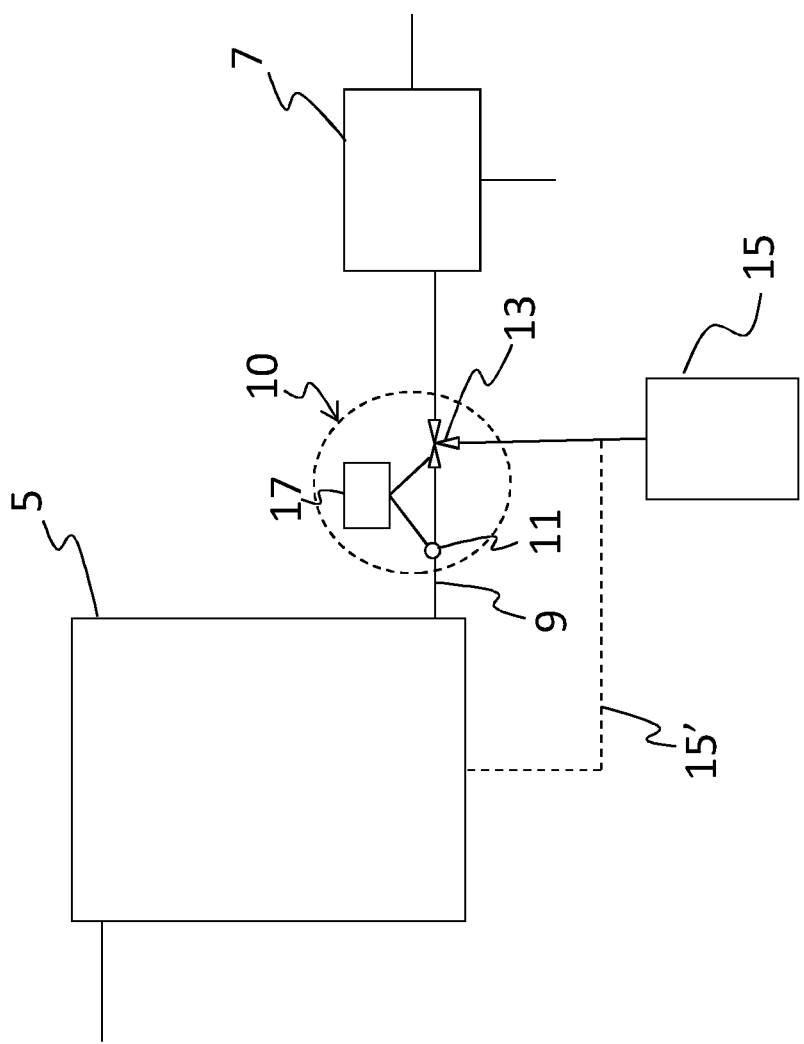
FIG. 1 shows schematically a part of an oil purification system according to one embodiment of the invention.

FIG. 1 shows schematically a part of an oil purification system according to one embodiment of the invention. The system comprises a preparation tank 5 in which a contaminated oil is provided. A chemical booster is provided to the contaminated oil in the preparation tank 5. The chemical booster is provided for boosting the capturing of impurities in the contaminated oil and/or for boosting a separation of phases in the contaminated oil. The chemical booster can be a liquid separation aid having a larger density than the oil thus forming a heavy phase together with the contaminating particles in the oil. Such a chemical booster could be used for purification of industrial oils which are not containing water. Another type of chemical booster which can be used for slop oils containing both water, oil, solid impurities and an emulsion phase (of water and oil), is an emulsion breaker, also called demulsifier, for breaking an emulsion phase of oil and water. A demulsifier can destabilize emulsions and facilitate separation of water and solids and/or salts from the oil. Another alternative chemical booster that can be used in this invention is a water cleaning product which will improve the separation of oil contaminants from water. Such a chemical booster may be suitable for the purification of industrial emulsions, such as cutting fluids. In one embodiment of the invention the preparation tank 5 can be warmed up by heaters provided to the tank. This could be for example steam coils provided inside the tank or heating elements provided to the outside of the tank. By warming the contaminated oil together with the booster the separation of phases and/or the capturing of impurities can be more efficient.

The oil purification system comprises further a centrifugal separator 7. This can be a centrifugal separator which is adapted for separating out water and/or sludge from oil which is useful for the purification of slop oils. The centrifugal separator can also be a decanter centrifuge adapted for separating particles and sludge from oil and water. Such a centrifuge can be used in a step of purification before the use of another centrifugal separator when slop oils are purified. Another type of centrifugal separator which can be used in this invention is adapted for separating oil and sludge from water which is useful in the purification of industrial emulsions, such as cutting fluids and oil contaminated water. In a process and system for purification of lubrication oils and/or industrial oils according to the invention a centrifugal separator 7 designed for separating impurities from the oil is used.

The oil purification system comprises further a fluid connection 9 allowing transfer of content out from the preparation tank 5. According to the invention a redirection arrangement 10 is provided in the fluid connection 9. The redirection arrangement comprises at least one sensor 11 provided in the fluid connection 9 and a valve 13 arranged in the fluid connection 9 to direct the content from the preparation tank 5 to either the centrifugal separator 7 or to another destination. The other destination could be another part of the system such as for example a storage tank 15 or back to the preparation tank 5, shown as an alternative with a dotted line 15' in FIG. 1. The content in the storage tank 15 can of course be further transferred for further purification. A pump (not shown) is also provided somewhere in the fluid connection 9 for pumping the content from the preparation tank 5. Furthermore according to the invention the redirection arrangement 10 comprises a control system 17 connected to the at least one sensor 11 and to the valve 13. The control system 17 is arranged for controlling the valve 13 to transfer the content coming through the fluid connection 9 from the preparation tank 5 either to the centrifugal separator 7 or to the other destination (for example the storage tank 15 or back to the preparation tank 5) in dependence of an output from the at least one sensor 11. In one embodiment of the invention two sensors 11 are provided in the redirection arrangement where one of the sensors is set to detect oil and the other is set to detect water.

The at least one sensor 11 is arranged to sense a property of the content passing the sensor in the fluid connection 9. The property sensed can be for example dielectric properties of the content. Such a sensor can be based on capacitive or microwave measurement technology or based on impedance spectroscopy. An advantage with this type of sensor is that it is a very stable type of sensor which is not affected by the environment. For example if impurities from the oil will be attached to the sensor the output from the sensor will not be affected as would be the case with many other types of sensors. This is especially useful when purifying slop oils because of the many impurities that can be present in slop oil. When slop oils are purified different phases comprising for example oil or water may be built up already in the preparation tank. According to the invention a phase of for example water can be redirected to for example a storage tank 15 by the redirection arrangement 10 instead of entering the centrifugal separator. For slop oil purification a sensor setup which can differentiate between oil and water can suitably be used. One possibility is to use at least one sensor measuring dielectric properties as described above. Possibly two such sensors can be combined where one of the sensors is tuned for giving a response for lower dielectric values than the other. Hereby the tuning can be set such that one of the sensors give a response when water is present and the other gives a response when oil is present.

When none of them gives a response air is present. The possibility to also detect air in the system is suitable and can be used for controlling of flows in the system. When water is detected the valve should in that case be controlled to transfer the content to the other destination, possibly the storage tank 15. When oil is detected or alternatively depending on sensor settings, when water is not detected the valve should be controlled to transfer the content to the centrifugal separator 7.

In purification systems which are arranged for purification of industrial oils or industrial emulsions where there are not as much impurities as in slop oils other types of sensors can be used instead. One example of a sensor which can be used is a sensor measuring density differences for example via a vibrating fork or Coriolis measurements. The control system 17 can be arranged to control said valve 13 to only transfer the content to the centrifugal separator 7 if the detected property corresponds to an oil content above a predefined threshold. Hereby impurities, water and sludge and oil containing more than a certain degree of impurities can be transferred to the other destination, possibly the storage tank 15, and not to the centrifugal separator 7. The content in the storage tank 15 could be transferred to another part of the system for further purification.

Figure 2:
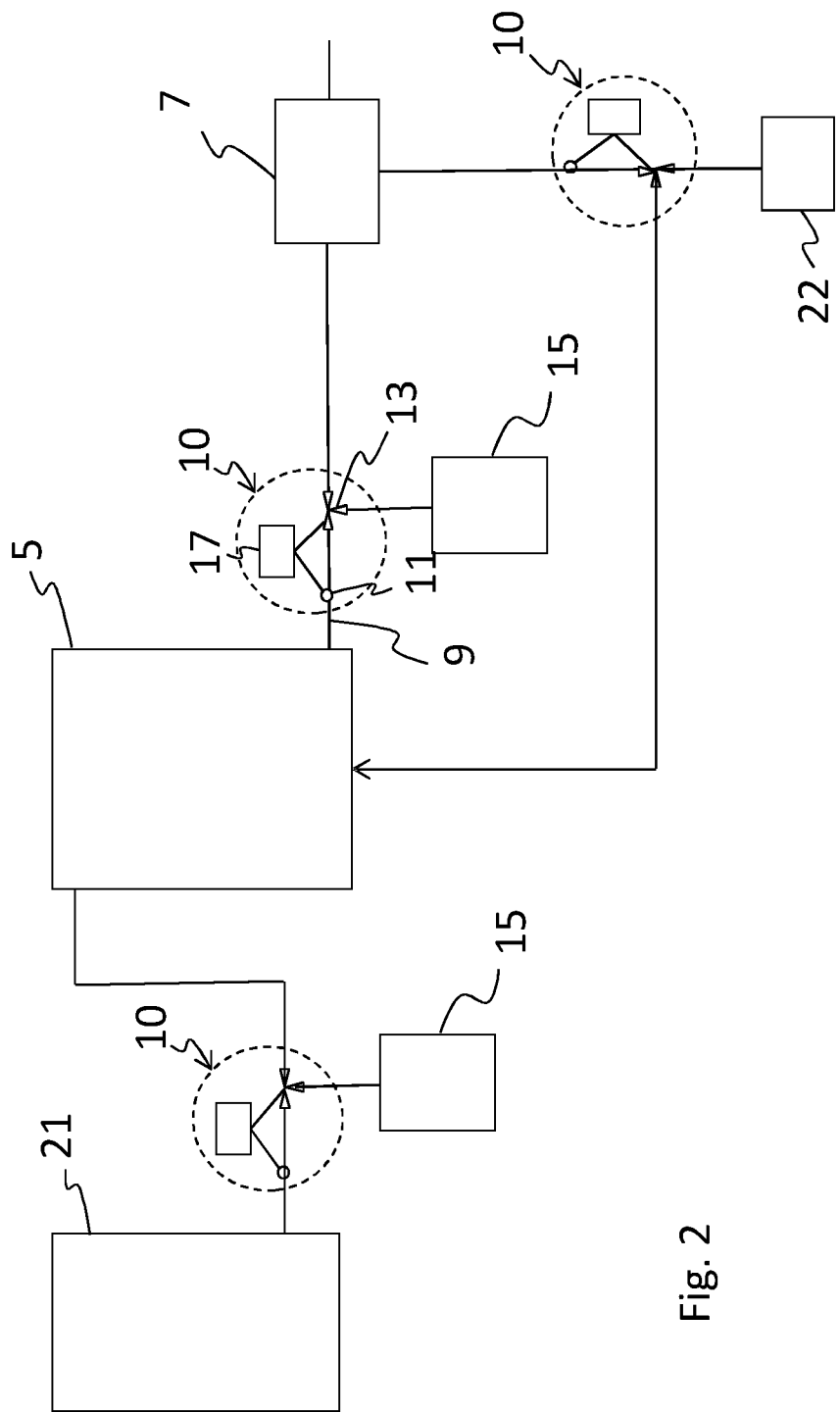
FIG. 2 shows schematically a part of an oil purification system according to one embodiment of the invention.

FIG. 2 shows schematically a part of an oil purification system according to one embodiment of the invention. In this embodiment it is shown that a redirection arrangement 10 according to the invention can be provided also in other positions of an oil purification system. Here it is shown that if a receiving tank 21 is provided before the preparation tank 5 an upstream redirection arrangement 10 according to the invention can be provided also between the receiving tank 21 and the preparation tank 5. Hereby for example water separated from oil in the receiving tank can be redirected to a storage tank 15 even before it is treated with a chemical booster in the preparation tank 5. Furthermore it is shown in this embodiment that a downstream redirection arrangement 10 can be provided also after the centrifugal separator 7. For example the redirection arrangement 10 can be provided to the outlet from the centrifugal separator where water is coming out if the centrifugal separator is separating oil and water. If the sensor 11 of the redirection arrangement 10 detects oil in this outlet from the centrifugal separator the flow could for example be directed back to the preparation tank 5 instead of to a water tank 22. The redirection arrangement 10 could also possibly be connected to a warning system or to an automatic stop function or to a control system. If oil is detected an alarm could be provided or the operation of the centrifugal separator could be automatically stopped or a flow in to the centrifugal separator could be reduced.

Figure 3:
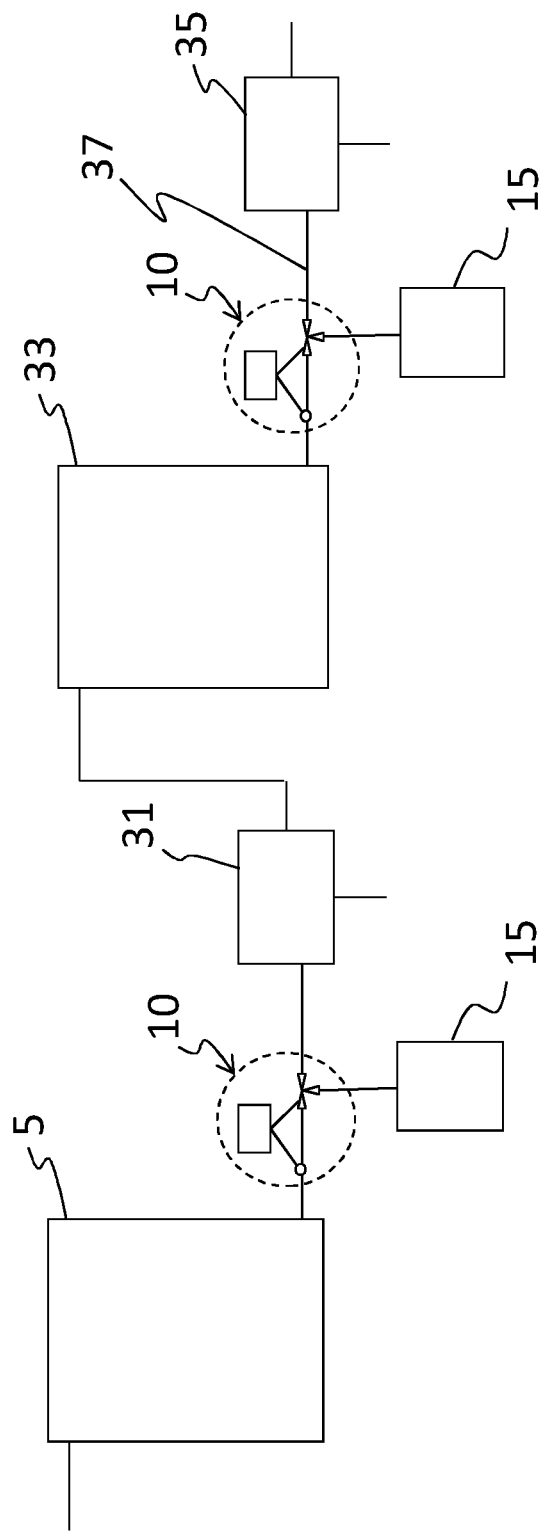
FIG. 3 shows schematically a part of an oil purification system according to one embodiment of the invention.

FIG. 3 shows schematically a part of an oil purification system according to one embodiment of the invention. In this embodiment it is shown that a redirection arrangement 10 according to the invention can be provided in more than one position of a purification system, for example if there are more than one centrifugal separators used. In a purification system where slop oils are purified the first centrifugal separator may be a decanter centrifuge 31 for separating sludge and particles. An oil phase retrieved from the decanter centrifuge can be transferred to a mediate tank 33. From the mediate tank 33 the oil can be further transferred through a fluid connection 37 to a second centrifugal separator 35. In the fluid connection 37 a redirection arrangement 10 according to the invention can be provided. A redirection arrangement 10 can also be provided between a preparation tank 5 and the decanter centrifuge 31 as described in relation to FIG. 1. Possibly the oil in the mediate tank 33 can be treated with a chemical booster and possibly the mediate tank can be warmed up for increasing separation effectivity in the same way as described for the preparation tank 5 in relation to FIG. 1.

Figure 4:
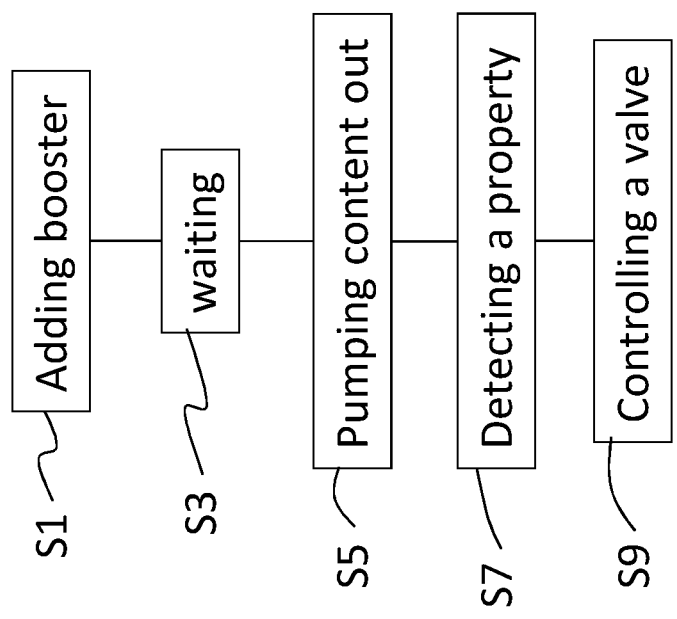
FIG. 4 is a flow chart of a method according to one embodiment of the invention.

FIG. 4 is a flow chart of a method according to one embodiment of the invention. The method steps are described below:

S1: Adding to a contaminated oil provided in a preparation tank 5 a chemical booster for boosting capturing of impurities and/or a separation of phases in the contaminated oil.

S3: Waiting for allowing different phases to be separated.

S5: Pumping content out from the preparation tank 5 through a fluid connection 9.

S7: Sensing a property of the content in the fluid connection 9.

S9: Controlling a valve 13 provided in the fluid connection 9 to transfer the content to a next step in the purification process or to another destination in dependence of the sensed property. The next step of the purification process can be a centrifugal separator. The other destination can be for example a storage tank or back to the preparation tank.

In one embodiment of the invention the step of controlling comprises controlling said valve 13 to only transfer the content to the next step of the purification process if the sensed property corresponds to an oil content above a predefined threshold.

In one embodiment of the invention the step of controlling comprises controlling said valve to not transfer the content to the next step of the purification process if the sensed property indicates that the content is water.

In one embodiment of the invention the step of sensing comprises sensing dielectric differences in the content or measuring density differences.

In one embodiment of the invention a step of warming the content in the preparation tank before it is pumped out is provided.

The system for purification of oil according to the invention further comprises a control system which is configured for controlling the system for purification of oil to perform the method according to the invention as described above. The control system is connected to pumps, valves and sensors in the purification system in order for controlling the flows in the system. The invention further comprises a computer program product comprising instructions which, when executed in a processor in the control system in the system for purification of oil of the invention, cause the control system to perform the method as described above.

The invention claimed is:

1. A method for purification of oil comprising the steps of:
adding to an oil comprising contaminating particles and provided in a preparation tank, a liquid separation aid to capture the particles and having a larger density than the oil, thus forming a heavy phase together with the particles;
allowing different phases to be separated;
pumping content out from the preparation tank through a fluid connection;
sensing at least one property of the thus-pumped content in the fluid connection, comprising sensing dielectric properties or measuring density differences;
controlling a three-way valve provided in the fluid connection to transfer the thus-pumped content to a next purification step to remove any remaining particles from the thus-pumped content or another destination in dependence on the sensed dielectric properties or measured density differences; and
controlling said valve to transfer the thus-pumped content to the next purification step of the purification process only if the sensed at least one property corresponds to an oil content above a predefined threshold, and to another tank or back to the preparation tank only if the sensed at least one property corresponds to an oil content below a predefined threshold.

2. A method according to claim 1, wherein a step of warming content in the preparation tank is provided before the content is pumped out.

3. A method according to claim 1, wherein the next purification step comprises centrifuging the thus-pumped content.

4. A method according to claim 3, comprising the additional steps of
providing a water tank downstream of and in communication with a centrifuge in the centrifuging step, and
directing water separated in the centrifuging step to the water tank or back to the preparation tank, by controlling a downstream three-way valve provided in fluid connection with and between the centrifuge and the water tank.

5. A method according to claim 3, comprising the additional steps of
sensing the presence of oil in a water outlet after centrifuging, and
if oil is detected in the water outlet after centrifuging, at least one of sounding an alarm, stopping the centrifuge, and reducing flow into the centrifuge.

6. A method according to claim 1, comprising the additional steps of
arranging a receiving tank upstream of and in communication with the preparation tank, and
directing water separated from oil in the receiving tank to a storage tank by controlling an upstream three-way valve provided in fluid connection between the receiving tank and the preparation tank.

7. A method according to claim 1, wherein in the next purification step,
sludge and particles are separated from the content by decanter centrifuging,
an oil phase retrieved from the decanter centrifuging is transferred to a mediate tank, and
a downstream three-way valve provided in fluid communication with the mediate tank is controlled to transfer the oil phase for further centrifuging when oil content is above a predefined threshold, and to another tank if oil content is below a predefined threshold.

8. A method according to claim 7, comprising the additional step of also adding said liquid separation aid to the mediate tank.

9. A method according to claim 1, wherein sludge and/or impurities are separated from the thus-pumped content.

10. A method according to claim 1, comprising the additional step of warming the content in the preparation tank.

11. A method for purification of oil comprising the steps of:
adding to an oil comprising at least one of water and an emulsion phase and provided in a preparation tank, a chemical booster for separating phases in the oil, wherein the chemical booster is an emulsion breaker or a water cleaning product;

allowing different phases to be separated;
pumping content out from the preparation tank through a fluid connection;
sensing at least one property of the thus-pumped content in the fluid connection, comprising sensing dielectric properties or measuring density differences;
controlling a three-way valve provided in the fluid connection to transfer the thus-pumped content to a next purification step in the purification process or another destination in dependence on the sensed dielectric properties or measured density differences;
controlling said valve to transfer the thus-pumped content to the next purification step of the purification process only if the sensed at least one property corresponds to an oil content above a predefined threshold, and to another tank or back to the preparation tank only if the sensed at least one property corresponds to an oil content below a predefined threshold; and
centrifuging the thus-pumped content in the next purification step.

12. A method according to claim 11, wherein a step of warming content in the preparation tank is provided before the content is pumped out.

13. A method according to claim 11, comprising the additional steps of
arranging a receiving tank upstream of and in communication with the preparation tank, and
directing water separated from oil in the receiving tank to a storage tank by controlling an upstream three-way valve provided in fluid connection between the receiving tank and the preparation tank.

14. A method according to claim 11, wherein water and oil are separated in the centrifuging step, and comprising the additional steps of
providing a water tank downstream of and in communication with a centrifuge in the centrifuging step, and
directing water separated in the centrifuging step to the water tank or back to the preparation tank, by controlling a downstream three-way valve provided in fluid connection with and between the centrifuge and the water tank.

15. A method according to claim 11, comprising the additional steps of
sensing the presence of oil in a water outlet after centrifuging, and
if oil is detected in the water outlet after centrifuging, at least one of sounding an alarm, stopping the centrifuge, and reducing flow into the centrifuge.

16. A method according to claim 11, wherein in the next purification step,
sludge and particles are separated from the content by decanter centrifuging,
an oil phase retrieved from the decanter centrifuging is transferred to a mediate tank, and
a downstream three-way valve provided in fluid communication with the mediate tank is controlled to transfer the oil phase for further centrifuging when oil content is above a predefined threshold, and to another tank if oil content is below a predefined threshold.

17. A method according to claim 16, comprising the additional step of
also adding said chemical booster to the mediate tank.

18. A method according to claim 11, comprising the additional step of
separating sludge and/or impurities from the thus-pumped content.

19. A system for purification of oil, said system comprising:
at least one preparation tank comprising oil to be purified and a liquid separation aid, the oil comprising contaminating particles,
wherein the liquid separation aid has a larger density than the oil and forms a heavy phase together with the particles;
at least one heater provided at the preparation tank;
at least one centrifugal separator;
a fluid connection allowing transfer of content out from the preparation tank; and
at least one redirection arrangement provided in the fluid connection, said redirection arrangement comprising a three-way valve which is arranged to direct the content from the preparation tank to either the centrifugal separator or another destination, said redirection arrangement further comprising at least one sensor and a control system connected to the at least one sensor and to the valve,
wherein said sensor is arranged to measure dielectric properties or density differences of the content passing in the fluid connection,
said control system is arranged for controlling said valve to transfer said content passing in the fluid connection to the centrifugal separator or the another destination in dependence on an output from the at least one sensor, and
the control system is arranged to control said valve to transfer the content passing in the fluid connection to the centrifugal separator only if the output from the at least one sensor corresponds to an oil content above a predefined threshold, and to another tank or back to the preparation tank only if the output from the at least one sensor corresponds to an oil content below a predefined threshold.

20. A system according to claim 19, additionally comprising a pump provided in the fluid connection for pumping the content out from the preparation tank.

21. A system according to claim 19, additionally comprising a tank situated at said another destination.

22. A system according to claim 21, additionally comprising a line for returning the content from the valve back to the preparation tank.

23. A system for purification of oil, said system comprising:
at least one preparation tank comprising oil to be purified and a chemical booster for separating phases in the oil, said oil to be purified comprising at least one of water and an emulsion phase,
wherein said chemical booster is an emulsion breaker or a water cleaning product;
at least one heater provided at the preparation tank;
at least one centrifugal separator;
a fluid connection allowing transfer of content out from the preparation tank; and
at least one redirection arrangement provided in the fluid connection, said redirection arrangement comprising a three-way valve which is arranged to direct the content from the preparation tank to either the centrifugal separator or another destination, said redirection arrangement further comprising at least one sensor and a control system connected to the at least one sensor and to the valve,
wherein said sensor is arranged to measure dielectric properties or density differences of the content passing in the fluid connection, said control system is arranged for controlling said valve to transfer said content to the centrifugal separator or the other destination in dependence on an output from the at least one sensor, and the control system is arranged to control said valve to transfer the content to the centrifugal separator only if the output from the at least one sensor corresponds to an oil content above a predefined threshold, and to another tank or back to the preparation tank only if the output from the at least one sensor corresponds to an oil content below a predefined threshold.

24. A system according to claim 23, additionally comprising a tank situated at said another destination.

25. A system according to claim 24, additionally comprising a line for returning the content from the valve back to the preparation tank.

* * * * *